United States Patent Office 2,727,069
Patented Dec. 13, 1955

2,727,069

PREPARATION OF UREA

Joseph P. M. Van Waes, Geleen, Netherlands, assignor to Stamicarbon N. V., Heerlen, Netherlands No Drawing. Application April 9, 1954,
Serial No. 422,263

Claims priority, application Netherlands April 15, 1953

5 Claims. (Cl. 260—555)

The present invention relates to novel improvements in preparing urea from gaseous ammonia and carbon dioxide using procedures in which the gaseous starting materials are mixed under pressure, heated and expanded, and ammonium carbamate is formed as an intermediate product.

Procedures of the type referred to above are generally carried out at relatively high temperatures and pressures, e. g., 170–200° C. and 150–200 atmospheres, respectively. Under such conditions, it is known that the intermediate carbamate melt is extremely corrosive, particularly when the carbon dioxide used contains sulphur compounds, e. g., hydrogen sulphide. It has also been thought that oxygen increases the corrosive nature of the carbamate melt.

Accordingly, precautions have been taken in prior procedures (see, for example, German Patents 812,909 and 860,487) to remove sulphur compounds and oxygen from the carbon dioxide utilized. Additionally, it is conventional practice to carry out the synthesis in apparatus made of or coated with suitable corrosion-resistant materials. Thus, for example, lead and silver have been used to form or coat at least those portions of the apparatus which contact the carbamate melt at the high reaction pressures and temperatures. The use of chromium-nickel steels has also been proposed for this purpose. However, experience has shown that such steels are severely attacked. Consequently, with apparatus made of these steels, small amounts of a polyvalent metal or metal compound are also used (U. S. Patents 1,986,973 and 2,129,689).

A further technique for minimizing corrosion caused by reaction mixtures containing ammonia and carbon dioxide, as encountered in urea synthesis, is described in U. S. Patent 1,875,982. This technique involves adding to the reaction mixture, corrosion-inhibiting substances which are capable of forming negatively charged colloidal particles in the mixture. With this technique, it is also necessary to utilize an oxidation agent in those cases where hydrogen sulphide or the like is present and the corrosion-inhibiting substance supplying the negatively charged colloidal particles does not itself possess oxidizing properties.

The principal object of the present invention is to provide novel improvements in minimizing corrosion in the synthesis of urea from gaseous $NH_3$ and $CO_2$.

A more specific object of the invention is to provide unique improvements which avoid corrosion caused by the normally corrosive carbamate melt formed as an intermediate in urea synthesis.

Other objects will appear hereinafter.

According to the present invention, the foregoing objects are realized by (a) effecting the urea synthesis in the presence of a small amount of oxygen and (b) using chromium-nickel steel containing at least 16% chromium and 8% nickel to form or coat at least those portions of the synthesis apparatus which are exposed to the reactants and high reaction temperatures and pressures.

Surprisingly, it has been found that by using these features (a) and (b), corrosion during the urea synthesis is substantially completely avoided.

Preferably, the exposed parts of the synthesis apparatus comprise austenitic-chromium-nickel steel including from 16 to 20% chromium, 10 to 14% nickel, and from 1.75 to 4% of a metal selected from the group consisting of molybdenum and zirconium. Other chromium-nickel steels may also be used, however, as long as they possess at least 16% chromium and 8% nickel.

The oxygen utilized, according to the invention, may be fed into the synthesizing apparatus separately or in admixture with the carbon dioxide or ammonia. Molecular oxygen is preferably utilized. However, as an alternative, the desired amount of oxygen may be generated in situ by using a compound which splits off free oxygen under the synthesis conditions. Thus, for example, per-compounds such as $H_2O_2$ and $BaO_2$ or the higher nitrogen oxides, may be satisfactorily used.

The amount of oxygen utilized to eliminate corrosion, according to the invention, depends primarily upon the quantity and nature of the corrosion-promoting impurities contained in the reaction mixture. Sulphur is an especially serious impurity and should be removed as completely as possible. However, from 10 to 15 mg. of sulphur per $m^3$ of carbon dioxide can be tolerated by using a somewhat larger amount of oxygen than in the case where no sulphur is present. Thus, for example, where less than 0.1% by volume of oxygen on the basis of carbon dioxide used is sufficient to prevent any corrosion in the absence of sulphur compounds, it is found that 0.2% by volume of oxygen should be used to prevent corrosion when up to 2 mg. of sulphur are present per $m^3$ of $CO_2$ and from 0.5 to 1% by volume of $O_2$, calculated on $CO_2$, is needed where the sulphur content is as high as 5 to 10 mg. per $m^3$ of $CO_2$.

The amount of oxygen or oxygen-forming substance added to the reactants should not, preferably, be any greater than is required to prevent corrosion under operating conditions. Otherwise, the carbamate melt will be contaminated by, for example, solid decomposition products resulting from the oxygen-forming substance and the amount of inert gases will be increased by excess oxygen or gaseous decomposition products. Generally speaking, therefore, the amount of oxygen added or formed in situ should not exceed about 3%, by volume, of the carbon dioxide utilized.

The following example further illustrates, but in no way limits, the invention described herein:

*Example*

In an apparatus for the synhtesis of urea, made of $V_4A$ steel (ausetnitic chromium-nickel steel containing 16–18% of Cr, 10–14% of Ni, 1.75–2.75% of Mo, and less than 0.1% of C), urea was prepared from $NH_3$ and $CO_2$. During the carbamate synthesis the pressure was maintained at about 175 atm. and the temperature at about 170° C.

The ammonia used was obtained by synthesis from $N_2$ and $H_2$ and was practically pure. The crude carbon dioxide contained 200–300 mg. of S per $m^3$, mainly in the form of hydrogen sulphide, had first been passed through box purifiers, after which the remainder of the sulphur compounds were removed catalytically at elevated temperature, so that the purified $CO_2$ contained less than 2 mg. of S per $m^3$. To this gas, 1% of technical oxygen was added. Before the apparatus was put into operation, it was passivated by a treatment with $HNO_3$.

A white final product was obtained which contained less than 0.0001% of Fe. The color, expressed in degrees Hazen (v. J. Amer. Chem. Soc. 18,264 (1896)), was 1–3°.

When the addition of oxygen was interrupted during the synthesis so that practically oxygen-free $CO_2$ was supplied, a marked red-brown discoloration occurred. At the same time, the iron content rose sharply. After about 2 hours the color had intensified to 28° Hazen and the iron content had risen to 0.0036%.

When the oxygen addition was started again, the color returned after a short time to pure white and the iron content decreased to the original low value. It is not necessary to passivate the apparatus before starting the operation since complete passivity is reached after a very short time and further maintained by the action of the oxygen.

Application of oxygen-forming substances such as $BaO_2$, in lieu of molecular oxygen, give substantially the same results.

It will be appreciated that various modifications may be made in the invention described above without deviating from the scope thereof as defined in the appended claims wherein:

I claim:

1. In the synthesis of urea wherein gaseous $NH_3$ and $CO_2$ are reacted in a form substantially free of sulphur and sulphur compounds using relatively high temperatures and pressures and apparatus having chromium-nickel steel surfaces exposed to the reactants and reaction conditions, and wherein a normally corrosive carbamate melt is obtained as an intermediate product, the improvement whereby the corrosive effect of said melt is minimized, said improvement comprising effecting said synthesis in the presence of from 0.1 to 3%, by volume, of oxygen based on the amount of $CO_2$ utilized and using, for the chromium-nickel steel surface, chromium-nickel steel containing at least 16% chromium and at least 8% nickel.

2. An improved process according to claim 1 wherein said chromium-nickel steel is an austenitic chromium-nickel steel comprising 16 to 20% chromium, 10 to 14% nickel, and 1.75 to 4% of a metal selected from the group consisting of molybdenum and zirconium.

3. An improved process according to claim 1 wherein said oxygen is in the form of molecular oxygen.

4. An improved process according to claim 1 wherein said oxygen is formed in situ by using a compound which splits off oxygen under the synthesis conditions, said compound being selected from the group consisting of percompounds and nitrogen oxides.

5. A process according to claim 1 wherein the $CO_2$ used as starting material contains from 5 to 10 mg. of sulphur per $m^3$ and the synthesis is effected in the presence of from 0.5 to 1% of oxygen, by volume, on the basis of the $CO_2$ utilized.

References Cited in the file of this patent
UNITED STATES PATENTS 2,680,766　　de Ropp et al. _____ June 8, 1954